United States Patent
Kang et al.

(10) Patent No.: US 8,249,136 B2
(45) Date of Patent: Aug. 21, 2012

(54) ADAPTIVE FREQUENCY SELECTIVE BASEBAND COMMUNICATIONS METHOD USING ORTHOGONAL CODES

(75) Inventors: Tae Wook Kang, Daejeon (KR); In Gi Lim, Daejeon (KR); Sung Weon Kang, Daejeon (KR); Tae Young Kang, Seoul (KR); Kyung Soo Kim, Daejeon (KR); Sung Eun Kim, Seoul (KR); Jung Bum Kim, Daejeon (KR); Jin Kyung Kim, Daejeon (KR); Kyung Hwan Park, Daejeon (KR); Hyung Il Park, Daejeon (KR); Byoung Gun Choi, Daegu (KR); Chang Hee Hyoung, Daejeon (KR); Jung Hwan Hwang, Daejeon (KR); Hey Jin Myoung, Daejeon (KR); Seok Bong Hyun, Daejeon (KR); Ki Hyuk Park, Daejeon (KR); Jae Hoon Shim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 433 days.

(21) Appl. No.: 12/633,980

(22) Filed: Dec. 9, 2009

(65) Prior Publication Data
US 2010/0290511 A1 Nov. 18, 2010

(30) Foreign Application Priority Data
May 15, 2009 (KR) .................. 10-2009-0042681

(51) Int. Cl.
*H04B 3/46* (2006.01)
*H04B 17/00* (2006.01)
*H04Q 1/20* (2006.01)

(52) U.S. Cl. ........ 375/224; 375/219; 375/260; 375/295; 375/316

(58) Field of Classification Search .................. 375/324, 375/224, 226, 340, 371
See application file for complete search history.

(56) References Cited

U.S. PATENT DOCUMENTS
7,039,370 B2 * 5/2006 Laroia et al. .................. 455/101
2002/0114046 A1 8/2002 Ookubo et al.
(Continued)

FOREIGN PATENT DOCUMENTS
JP 09-331372 A 12/1997
(Continued)

OTHER PUBLICATIONS
T.G. Zimmerman, "Personal Area Networks: Near-field intrabody communication," IBM Systems Journal, 1996, pp. 609-617, vol. 35, No. 3&4.

*Primary Examiner* — Ted Wang

(57) ABSTRACT

An adaptive frequency selective baseband communications method using orthogonal codes includes: a communications testing step of performing communications by using one of a plurality of codes each having a different frequency band; a proper code selecting step of selecting a proper code by using a correlation value of a plurality of codes included in test data transmitted in the communications testing step; a communications performing step of performing communications by using the proper code; and a feedback step of newly selecting a proper code by using the correlation value of the plurality of codes included in the test data transmitted in the communications performing step if a pre-set time duration has lapsed or if a reception error of more than a pre-set reference occurs, and performing the communications performing step again, wherein the test data transmitted in the communications testing step and the communications performing step includes a plurality of codes each having a different frequency band.

8 Claims, 7 Drawing Sheets

U.S. PATENT DOCUMENTS

| | | |
|---|---|---|
| 2008/0165717 A1* | 7/2008 | Chen et al. .................. 370/312 |
| 2010/0171562 A1 | 7/2010 | Lim et al. |
| 2011/0029825 A1 | 2/2011 | Lim et al. |

FOREIGN PATENT DOCUMENTS

| | | |
|---|---|---|
| JP | 2002-247135 A | 8/2002 |
| JP | 2010-531606 A | 9/2010 |
| JP | 2010-537540 A | 12/2010 |
| JP | 2010-538518 A | 12/2010 |
| WO | WO 03/032511 A1 | 4/2003 |
| WO | WO 2008/039030 A1 | 4/2008 |
| WO | WO 2008/060045 A1 | 5/2008 |
| WO | WO 2008/147093 A1 | 12/2008 |
| WO | WO 2009/005217 A1 | 1/2009 |

* cited by examiner

ADAPTIVE FREQUENCY SELECTIVE BASEBAND COMMUNICATIONS METHOD USING ORTHOGONAL CODES

CROSS-REFERENCE TO RELATED APPLICATIONS

This application claims the priority of Korean Patent Application No. 10-2009-0042681 filed on May 15, 2009, in the Korean Intellectual Property Office, the disclosure of which is incorporated herein by reference.

BACKGROUND OF THE INVENTION

1. Field of the Invention

The present invention relates to an adaptive frequency selective baseband communications method using orthogonal codes and, more particularly, to an adaptive frequency selective baseband communications method using orthogonal codes capable of increasing detection accuracy in detecting a reception signal by adaptively selecting a frequency band of a transmission signal to avoid noise varied by surrounding environments and minimizing interference between transmission signals by using codes with orthogonality in human-body communications using a human body as a medium. In addition, the present invention relates to a method of obtaining a time diversity or frequency diversity gain under conditions in which human body users interfere with each other or in which heavy interference induced from an electronic device is generated, to thereby implement a low-power, stable human-body communications method.

2. Description of the Related Art

In general, human-body communications refers to a technique that transfers signals between devices connected with a human body having conductivity by using the human body as a communications channel. With the human-body communications technique, a network for communications between various mobile devices such as a personal digital assistant (PDA), a mobile personal computer, a digital camera, an MP3 player, a mobile phone, and the like, or communications with a fixed device such as a printer, a TV, an entrance system, or the like, is established as a user simply comes in contact therewith.

In more detail, the human-body communications is a technique that transmits information by using a limited frequency band in which the strength of a signal transmitted via a human body serving as a waveguide is stronger than that of a signal radiated to the outside of the human body, having the properties of consuming small energy and being resistant to external noise.

Meanwhile, frequency selective baseband communications refers to a transmission technique only allowing the use of codes having the best frequency characteristics for a user-desired frequency band, thus simplifying an analog transmission/reception unit. Namely, the frequency selective baseband communications allows for the selection of a desired frequency band while performing baseband transmission.

With human-body communication, however, the characteristics of human body channels differ according to surrounding environments, which may generate noise at a particular frequency band. In addition, interference that may be caused as users who are in human-body communications become close to each other, as well as heavy interference induced from an electronic device is problematic. Thus, in terms of the characteristics of human-body communications performed during the activities of daily life, rather than under particular conditions, those problems must be solved in order to ensure smooth and stable communication.

SUMMARY OF THE INVENTION

An aspect of the present invention provides an adaptive frequency selective baseband communications method using orthogonal codes capable of increasing a detection accuracy in detecting a reception signal by minimizing noise by adaptively selecting a frequency band of a transmission signal according to surrounding environments and minimizing an interference between transmission signals by using codes with orthogonality.

Another aspect of the present invention provides a method of obtaining a time diversity or frequency diversity gain under conditions in which human body users are interfered with each other or in which heavy interference induced from an electronic device is generated, to thereby implement a low-power, stable human-body communications method.

According to an aspect of the present invention, there is provided an adaptive frequency selective baseband communications method using orthogonal codes, including: a communications testing step of performing communications by using one of a plurality of codes each having a different frequency band; a proper code selecting step of selecting a proper code by using a correlation value of a plurality of codes included in test data transmitted in the communications testing step; a communications performing step of performing communications by using the proper code; and a feedback step of newly selecting a proper code by using the correlation value of the plurality of codes included in the test data transmitted in the communications performing step if a pre-set time duration has lapsed or if a reception error of more than a pre-set reference occurs, and performing the communications performing step again, wherein the test data transmitted in the communications testing step and the communications performing step includes a plurality of codes each having a different frequency band.

In the proper selecting step, the correlation values of each of the plurality of codes included in the test data transmitted in the communications testing step are calculated and a code having the smallest correlation value is selected as a proper code.

In the feedback step, the correlation values of each of the plurality of codes included in the test data transmitted in the communications performing step are calculated and a code having the smallest correlation value is newly selected as a proper code, and the communications performing step is performed again.

The test data transmitted in the communications testing step and the communications performing step is included in a header of transmission data transmitted or received in the communications testing step and communications performing step.

In the communications performing step, communications are performed by changing one or more of a time diversity (TD) degree and a frequency diversity (FD) degree or by changing a modulation degree.

According to another aspect of the present invention, there is provided an adaptive frequency selective baseband communications method using orthogonal codes, including: a communications testing step of performing communications by using one of a plurality of codes each having a different frequency band; a proper code selecting step of detecting a reception error and selecting a proper code by using the detected reception error; a communications performing step of performing communications by using the proper code; and a feedback step of sequentially repeating the proper code selecting step and the communications performing step continuously while communications are being performed.

In the proper code selecting step, if the detected reception error is smaller than a pre-set reference value, currently used code may be selected as a proper code, whereas if the detected reception error is not smaller than the pre-set reference value, one of the plurality of remaining codes, excluding the currently used code, may be selected as a proper code.

In the communications performing step, communications are performed by changing one or more of a time diversity (TD) degree and a frequency diversity (FD) degree or by changing a modulation degree.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
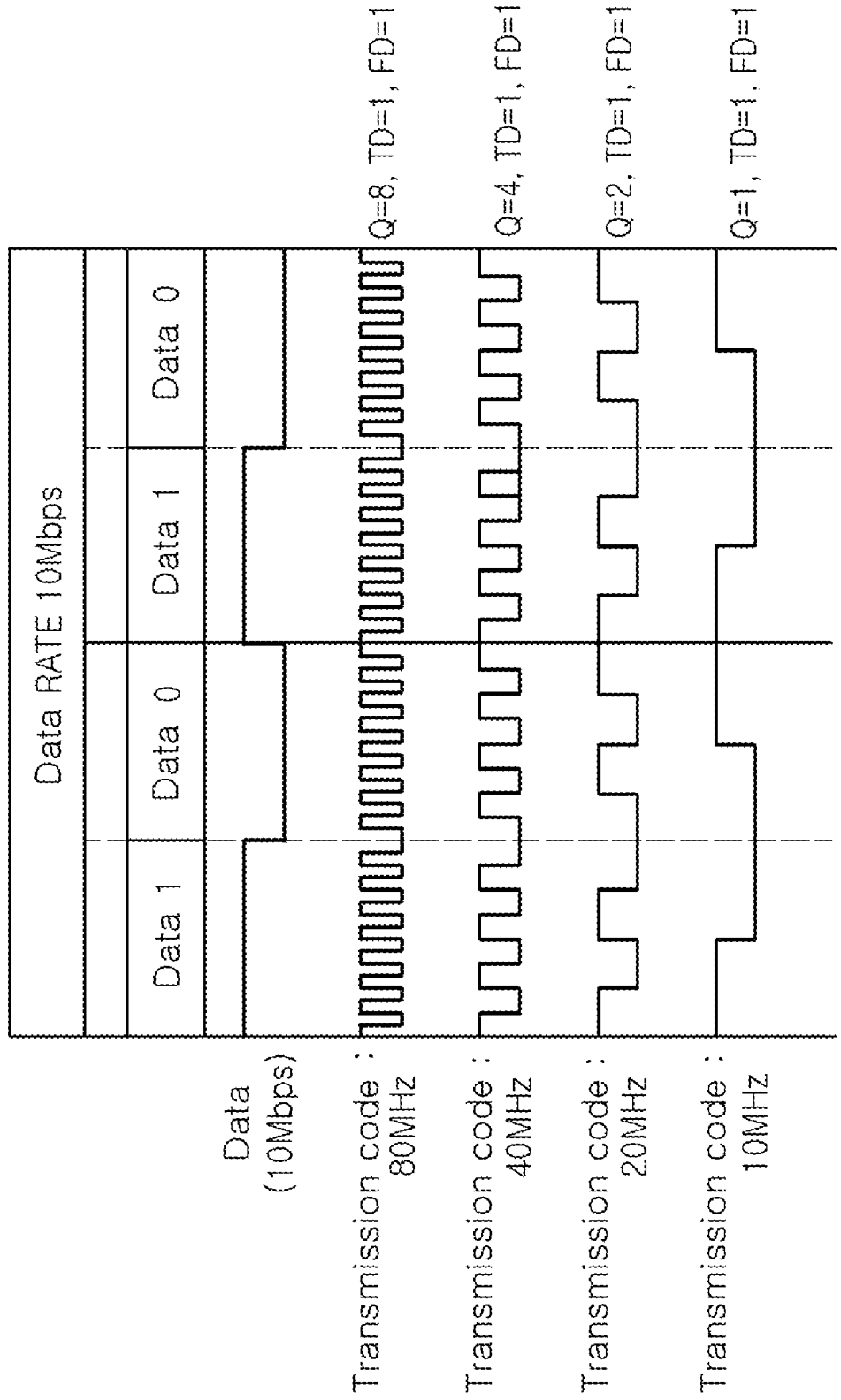
FIG. 1 illustrates several transmission codes generated by dividing a 160 MHz system block.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

A method of performing communications by using orthogonal codes will now be described.

First, a transmission code to be used for communications is selected. When the bit values of data transmitted by using the transmission code are 1 and 0, orthogonal codes are generated such that they have a 180-degree phase difference. Sequentially, the data transmitted by using the orthogonal codes is mapped, which is then used as a transmission code to perform communication.

FIG. 1 illustrates several transmission codes generated by dividing a 160 MHz system block.

The transmission codes are defined as values Q, TD, and FD, respectively. The value Q indicates the number of cycles of a transmission code in transmitting a single bit, TD indicates the degree of time diversity, and FD indicates the degree of frequency diversity. Accordingly, value Q determines a major frequency band of a transmission code. For example, if a transmission code mapping bits 1 and 0 corresponding to a transmission speed of 10 Mbps has values of Q=8, TD=1, and FD=1, a major frequency band of such a transmission code is 80 Mhz. In the same manner, if the transmission code mapping bits 1 and 0 corresponding to the transmission speed of 10 Mbps has values of Q=4, TD=1, and FD=1, a major frequency band of the transmission code is 40 MHz, if the transmission code mapping bits 1 and 0 corresponding to the transmission speed of 10 Mbps has values of (2) Q=2, TD=1, FD=1, a major frequency band of the transmission code is 20 MHz, and if the transmission code mapping bits 1 and 0 corresponding to the transmission speed of 10 Mbps has values of (3) Q=1, TD=1, FD=1, a major frequency band of the transmission code is 10 MHz.

In addition, FIG. 1 illustrates orthogonal codes each having a phase difference of 180 degrees generated when bits are 1 or 0 by using each transmission code. As stated above, transmission data is mapped by using the orthogonal codes, and communications is performed by using such orthogonal codes as transmission codes.

Figure 2:
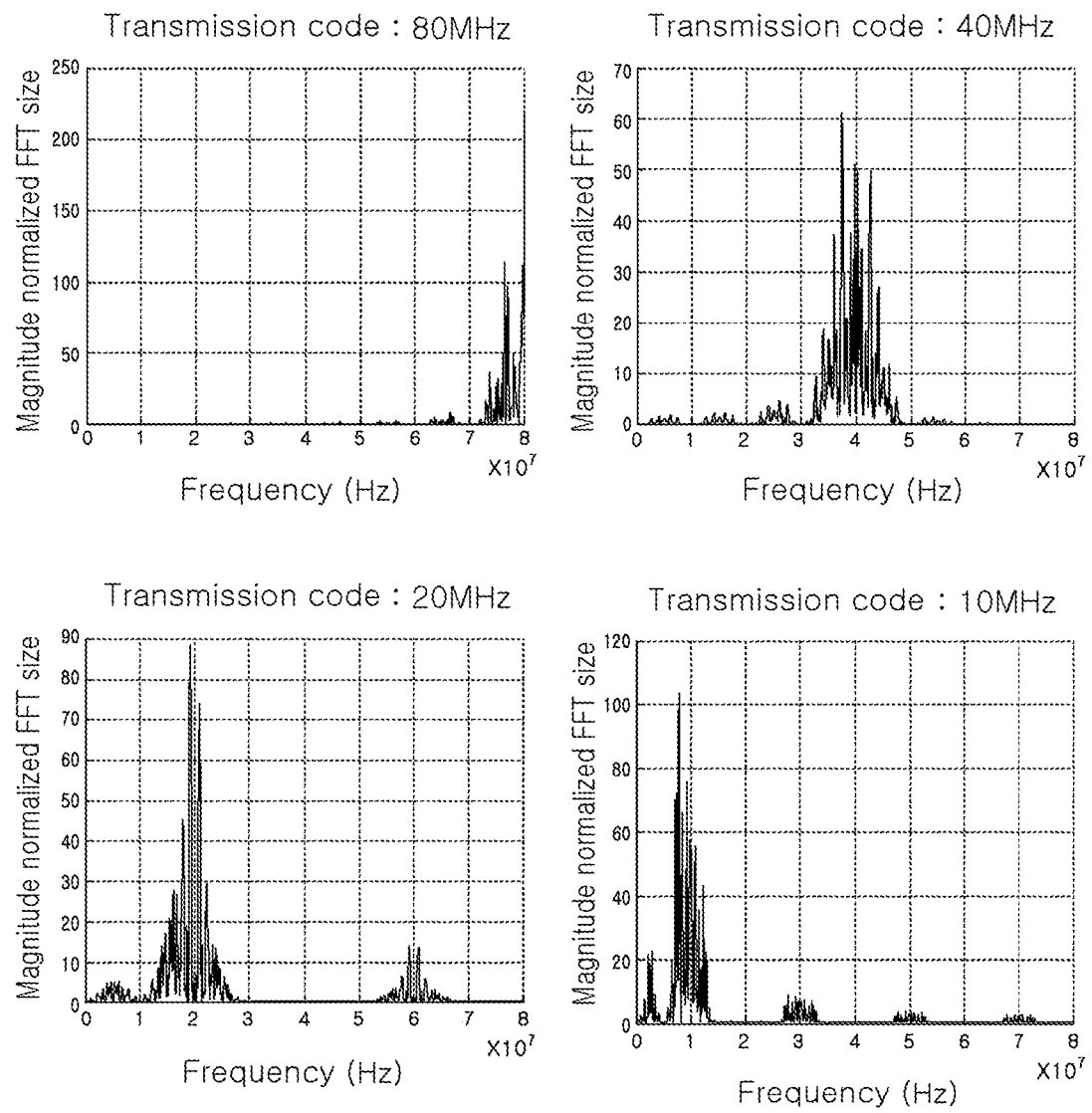
FIG. 2 is graphs of frequency characteristics of transmission codes over Q values.

FIG. 2 consists of graphs detailing the frequency characteristics of transmission codes over Q values.

Corresponding codes according to each Q value have a limited frequency band as a major frequency band. With reference to FIG. 2, it is noted that when the Q values of transmission codes are 8, 4, 2, and 1, respectively, the major frequency bands of the transmission codes are 80 MHz, 40 MHz, 20 MHz, and 10 MHz, respectively. This is consistent with those as described with reference to FIG. 1.

Figure 3:
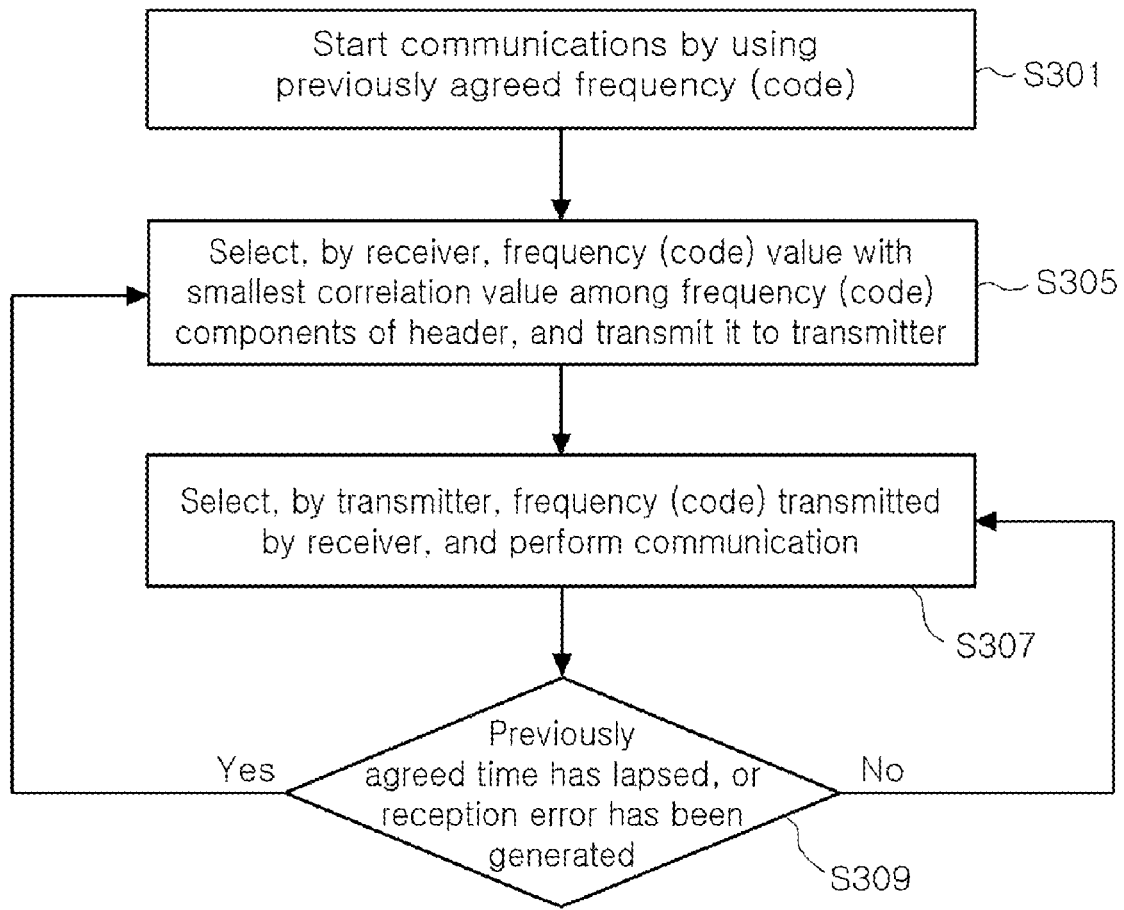
FIG. 3 is a flow chart illustrating the process of a method of selecting a proper code according to a surrounding interference and noise situation by using correlation values of transmission codes included in a header of a frame of a transmission signal, and performing communication.

FIG. 3 is a flow chart illustrating the process of a method of adaptively selecting a frequency band, namely, a proper code, according to surrounding interference and noise circumstances by using the correlation values of transmission codes included in a header of a frame of a transmission signal, and performing communication.

The correlation values will be described first before the method of FIG. 3 is described.

Correlation values of digital data are calculated such that respective bits are XORed (exclusively ORed) and the corresponding results values of the respective bits are all added. For example, the correlation value between 1010 and 1011 is 1, and that between 1010 and 1111 is 2. Namely, as much portions of two digital data are not consistent with each other, their correlation value increases, while much portions of two data are consistent, their correlation value decreases. If the two digital data are completely consistent, their correlation value is 0.

Accordingly, when a calculated correlation value of certain test data included in a transmission signal and a reception signal is small, it means that only slight distortion is generated.

With reference to FIG. 3, a transmitter and a receiver start communication, and in this case, a previously agreed transmission code among several transmission codes is used (S301).

Figure 4:
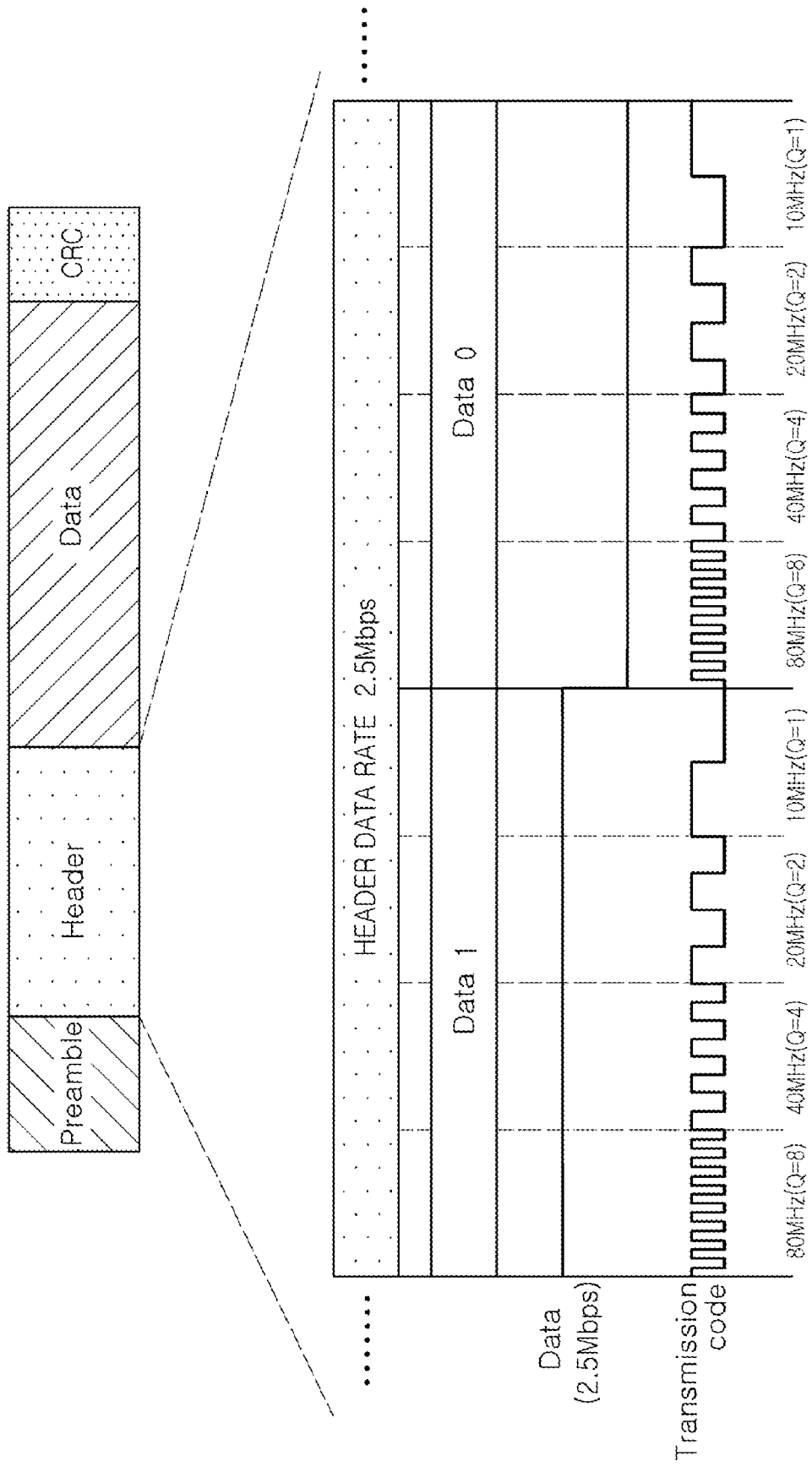
FIG. 4 illustrates test data included in a header to calculate correlation values.

In S305, the receiver calculates a correlation value of each transmission code included in a header of a received signal, selects a transmission code having the smallest correlation value as a proper code, and transmits it to the transmitter. In this case, it assumed that all the transmission codes are included in the header. Thus, the transmitter maps each bit of test data into all the transmission codes in the header and transmits the same. The test data is used to calculate a correlation value of each transmission code, and thus, the receiver side is also aware of the value of the test data. FIG. 4 illustrates an example of test data.

In step S307, the transmitter performs communications by using the proper code which has been transmitted by the receiver. The transmitter generates an orthogonal code by using the proper code, and maps transmission data with the orthogonal code to perform communication. This communications performing method is the same as described above.

In step S309, when certain previously agreed time duration has lapsed after communications start in S307, or if a reception error such as a cyclic redundancy check (CRC) error larger than a certain reference value or the like occurs, the process is returned to step S305, step S305 is performed and the step S307 is then repeatedly performed.

Figure 5:
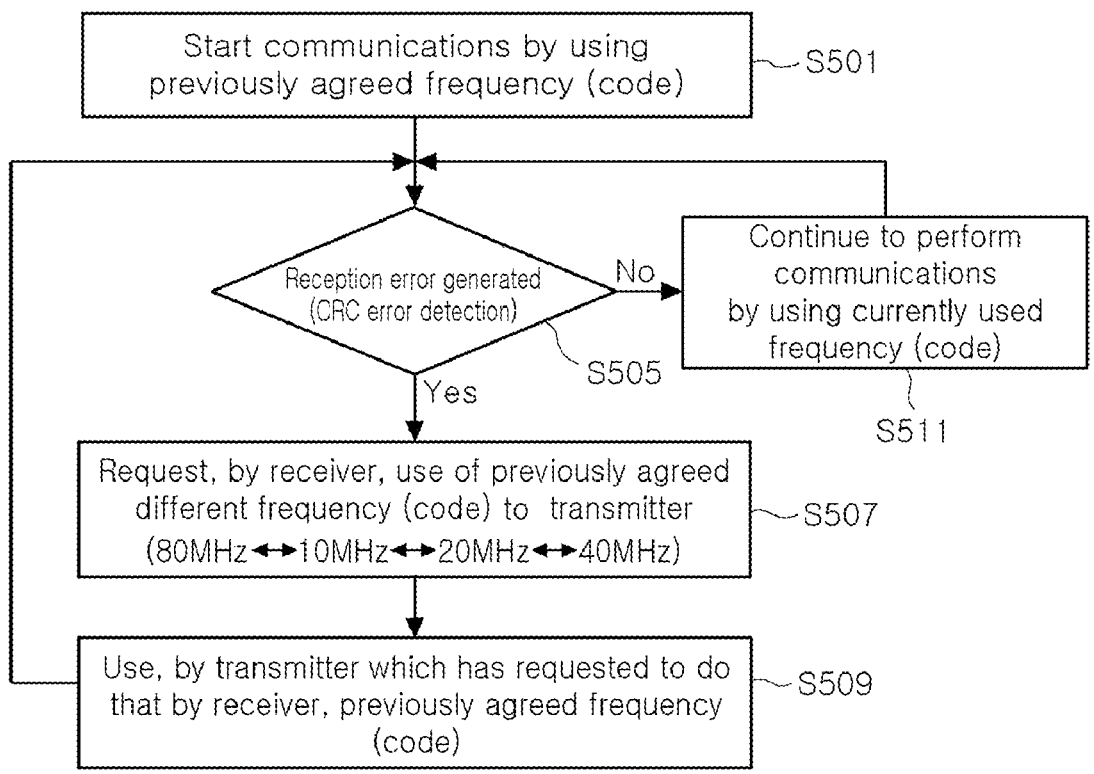
FIG. 5 is a flow chart illustrating the process of a method of selecting a proper code according to a reception error of a received signal and performing communication.

FIG. 5 is a flow chart illustrating the process of a method of adaptively selecting a frequency band according to a reception error of a received signal and performing communication.

With reference to FIG. 5, the transmitter and the receiver start communication, and in this case, a previously agreed transmission code among several transmission codes is used (S501).

In step S505, the receiver detects a reception error such as a CRC error of the received signal.

If the reception error larger than a pre-set reference value has not occurred, in step S511, a currently used transmission code is used as it is, to continuously perform communication.

If, however, a reception error larger than the pre-set reference value occurs, in step S507, the receiver selects one of transmission codes, excluding a currently used one, as a proper code, and transmits a message indicating that communications is to be performed by using the proper code, in step S507. Upon receiving the message, the transmitter performs communications by using the proper code in step S509.

There may be various methods of selecting one of the transmission codes, excluding the currently used transmission code. FIG. 5 illustrates the method of selecting a transmission code having a major frequency band farthest from the major frequency band of the currently used transmission code and then selecting transmission codes, each having a major frequency band, which becomes closer, starting from the transmission code having the second farthest one.

After step S509, the process is returned to step 505 to check whether or not a reception error of larger than the pre-set reference value has occurred, and then, steps S507, S509, and S511 are performed.

FIGS. 6(a) to 6(d) illustrate transmission codes for improving a communications environment by obtaining a time diversity or frequency diversity gain.

The method of improving a communications environment by using such transmission codes is especially useful when a communications environment remains marginal because of a poor surrounding environment or in which there is heavy interference between users in spite of the use of the methods proposed in FIG. 3 or FIG. 5.

Figure 6:
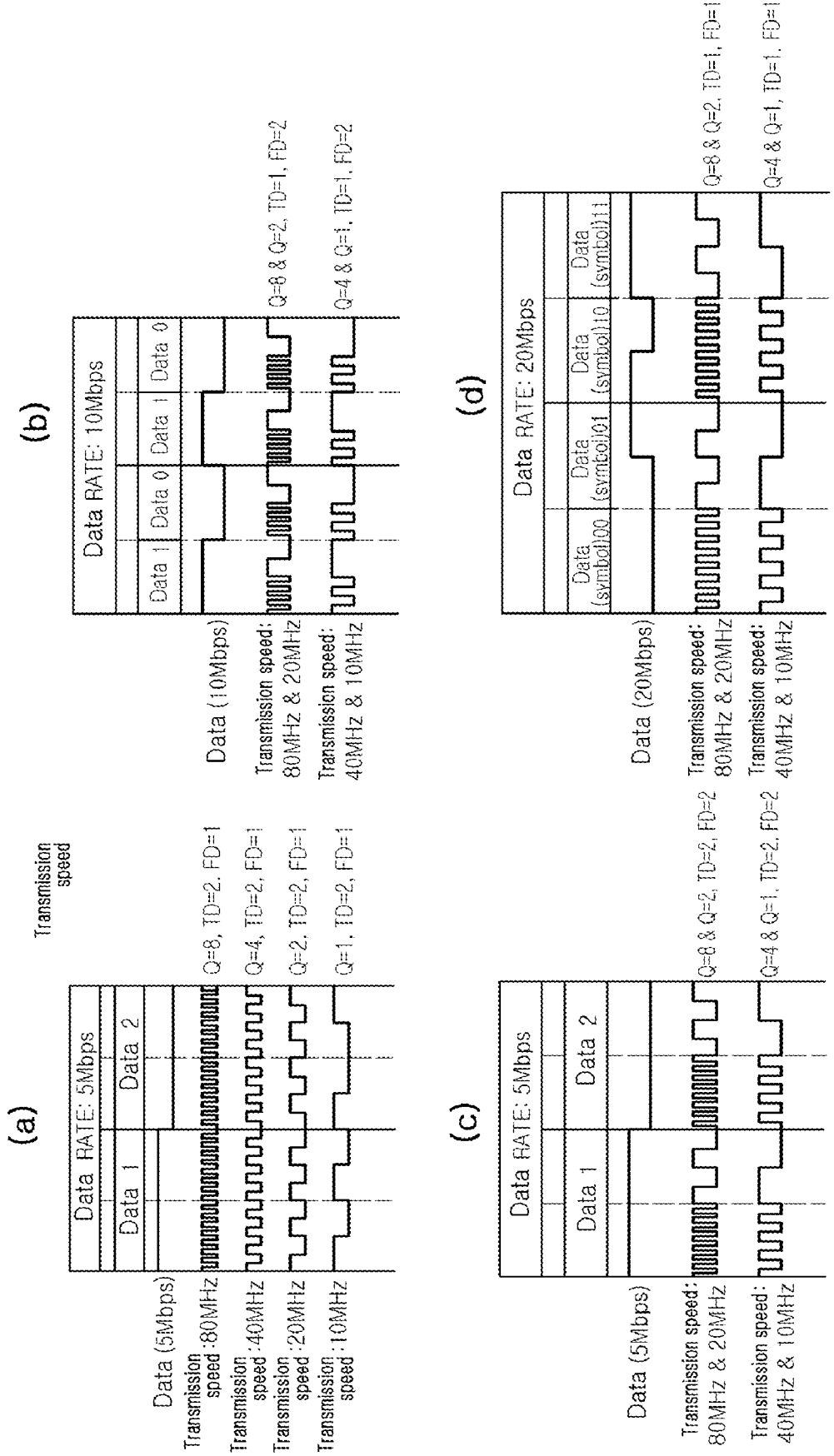
FIGS. 6(a) to 6(d) illustrate transmission codes for improving a communications environment and transmission codes for increasing a transmission speed by obtaining a time diversity or frequency diversity gain.

FIG. 6(a) illustrates codes that can obtain a time diversity gain.

For example, when a transmission code having values of Q=8, TD=2, and FD=1 is selected, the same data can be transmitted during double time, obtaining a time diversity gain, compared with a transmission code having values of Q=8, TD=1, and FD=1. Namely, the time diversity gain is related only to the TD value, the time diversity degree.

FIG. 6(b) illustrates codes for obtaining a frequency diversity gain.

For example, in case of a transmission code having values of Q=8 & Q=2, TD=1, and FD=2, because it has two different major frequency bands, it can obtain a frequency diversity to improve a reception performance. In this case, because FD=2, having two different frequency bands, it obviously has the two different Q values.

FIG. 6(c) illustrates transmission codes for obtaining both time diversity and frequency diversity gains.

FIG. 6(d) illustrates transmission codes for increasing a transmission speed by increasing a modulation degree. With reference to FIG. 6(d), rather than mapping bits 1 or 0 of transmission data by using a transmission code having values of Q=8 & Q=2, TD=1, and FD=1, two different frequency bands are used, so the bits 00, 01, 10, and 11 of transmission data can be all mapped, and thus, the transmission speed can be doubled. This method of increasing the transmission speed by using such transmission code can be favored for a case where a reception signal detection margin is sufficient because of small noise of a communications environment or a large channel gain.

Figure 7:
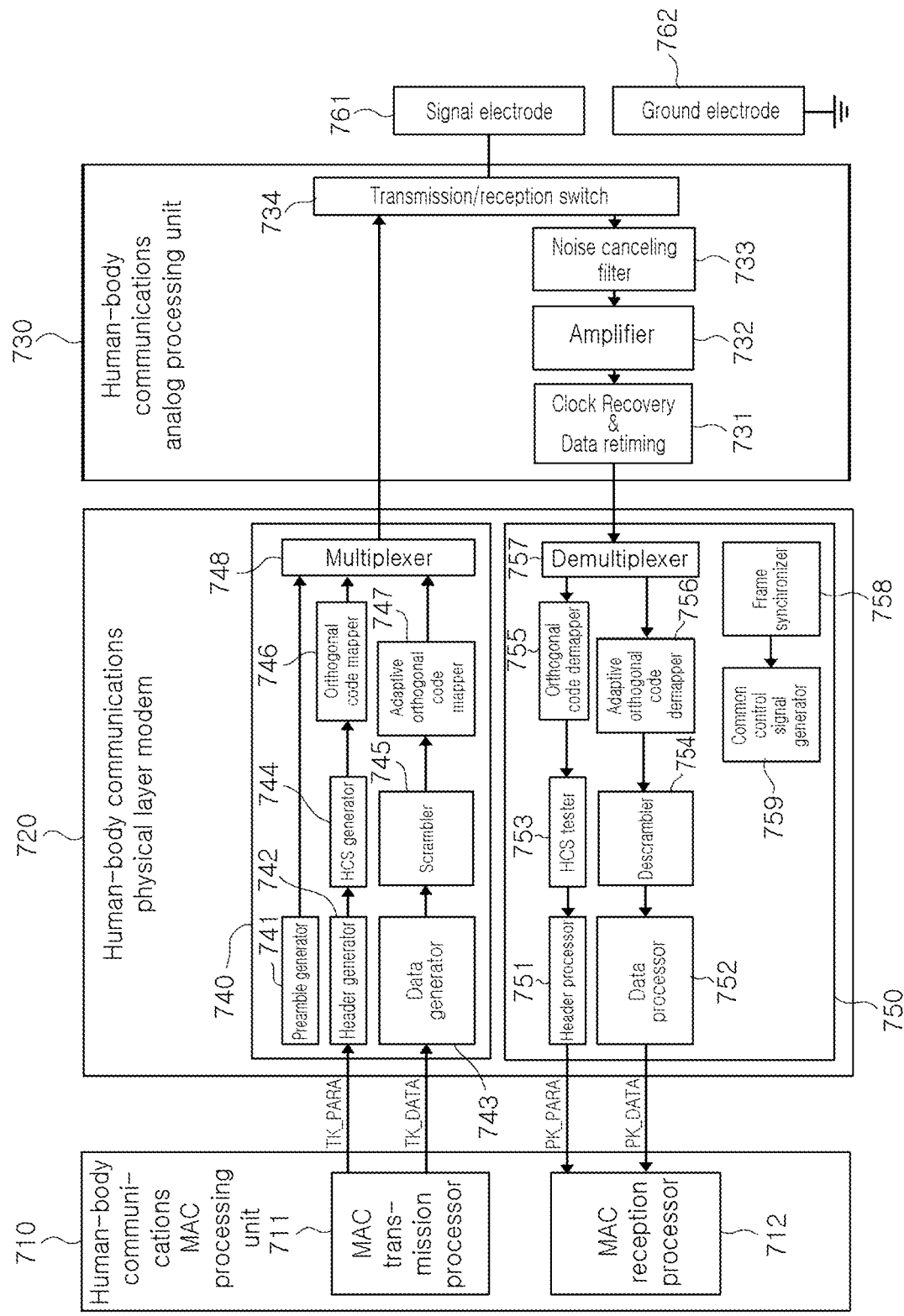
FIG. 7 is a schematic block diagram showing the configuration of an adaptive frequency selective baseband communications system using orthogonal codes according to an exemplary embodiment of the present invention.

FIG. 7 is a schematic block diagram showing the configuration of an adaptive frequency selective baseband communications system using orthogonal codes according to an exemplary embodiment of the present invention.

The system for performing the adaptive frequency selective baseband communications method using orthogonal codes includes a human-body communications MAC processing unit 710, a human-body communications physical layer modem 720, a human-body communications analog processing unit 730, a signal electrode 761, and a ground electrode 762.

In detail, the human-body communications MAC processing unit 710 includes a MAC transmission processor 711 and a MAC reception processor 712.

The human-body communications physical layer modem 720 includes a transmitter 740 and a receiver 750.

The transmitter 740 includes a preamble generator 741, a header generator 742, a data generator 743, a header check sequence (HCS) generator 744, a scrambler 745, an orthogonal code mapper 746, an adaptive orthogonal code mapper 747, and a multiplexer 748.

The receiver 750 includes a header processor 751, a data processor 752, an HCS tester 753, a descrambler 754, an orthogonal code demapper 755, an adaptive orthogonal code demapper 756, a demultiplexer 757, a frame synchronizer 758, and a common control signal generator 759.

The human-body communications analog processing unit 730 includes a clock recovery & data retiming (CDR) 731, an amplifier 732, a noise canceling filter 733, and a transmission/reception switch 734.

A transmission process is as follows.

The MAC transmission processor 711 processes data and data information to be transmitted, which have been received from an upper layer, and transfers the same to the transmitter 740 within the human-body communications physical layer modem 720.

The preamble generator 741 is set as an initial value known by every user, generates a preamble of a certain length, and provides the generated preamble to the multiplexer 748.

The header generator 742 receives the data information (e.g., a transmission speed, a modulation scheme, a user ID, a data length, etc.) from the human-body communications MAC processing unit 710, configures the data information to have a previously agreed header format, and provides the same to the HCS generator 744. The HCS generator 744 generates an HCS, and provides it to the orthogonal code mapper 746. Then, the orthogonal code mapper 746 maps the HCS with an orthogonal code, and provides the same to the multiplexer 748.

The data generator 743 receives the data transmitted from the MAC transmission processor 711, and outputs it at a desired time. The scrambler 745 which has been initialized by the user ID outputs an orthogonal code. The orthogonal code is XORed with an output from the data generator 743, completing data scrambling. The adaptive orthogonal code mapper 747 generates an orthogonal code by using a proper code, maps scrambled data, i.e., an output from the scrambler 745, by using the generated orthogonal code, and provides the same to the multiplexer 748.

The multiplexer 748 outputs a preamble, a header and data according to a frame configuration, and provides the same to the transmission/reception switch 734 within the human-body communications analog processing unit 730. The transmission signal is finally transferred to a human body via the signal electrode 761.

A reception process is as follows.

A reception signal input via the signal electrode 761 passes through the transmission/reception switch 734 and the noise canceling filter 733 that cancels noise added during transmission in the interior of a human body, and is then amplified into a signal of a desired size by the amplifier 732. The amplified signal is input to the CDR 731, in which the reception signal and a reception end clock are timing-synchronized and frequency offset is compensated. An output from the CDR 731 is input to the receiver 750 within the human-body communications physical layer modem 720.

The demultiplexer 757 receives a signal from the human-body communications analog processing unit 730 and provides the signal to the orthogonal code demapper 755 and the adaptive orthogonal code demapper 756. In this case, if frame synchronization has not been performed yet, the frame synchronizer 757 performs frame synchronization using a preamble, and the common control signal generator 759 generates a common control signal to control the overall operation of the receiver 750.

Regarding the process following the demultiplexer 757, a header part of the received signal passes through the orthogonal code demapper 755 and the HCS tester 753. And, the header processor 751 then extracts control information of the reception signal data and transmits the extracted control information to the MAC reception processor 712. A data part of the received signal is input to the adaptive orthogonal code demapper 756, in which a correlation value is calculated by using an orthogonal code which was frequency-selectively used by the transmitter, and a data bit of the smallest value is output from the adaptive orthogonal code demapper 756. The data bit output from the adaptive orthogonal code demapper 756 is input to the descrambler 754, and descrambled with an orthogonal code output from an orthogonal code generator which has been initialized by a user ID extracted from the header, which is then provided to the data processor 752.

The MAC reception processor 712 receives the data and data information from the receiver 750 within the human-body communications physical layer modem 720, processes them, and transfers the processed data and data information to an upper layer.

As set forth above, in the adaptive frequency selective baseband communications method using orthogonal codes according to exemplary embodiments of the invention, a detection accuracy of a reception signal can be increased by adaptively selecting a frequency band having the smallest noise according to a change in surrounding environments and using a code having orthogonality. In addition, the low-power, stable human-body communications method can be implemented by proposing the method of obtaining a time diversity or frequency diversity under conditions that human body users interfere with each other or in which heavy interference induced from an electronic device is generated.

While the present invention has been shown and described in connection with the exemplary embodiments, it will be apparent to those skilled in the art that modifications and variations can be made without departing from the spirit and scope of the invention as defined by the appended claims.

What is claimed is:

1. An adaptive frequency selective baseband communications method using orthogonal codes, the method comprising:
    a communications testing step of performing communications by using one of a plurality of codes each having a different frequency band;
    a proper code selecting step of selecting a proper code by using a correlation value of a plurality of codes included in test data transmitted in the communications testing step;
    a communications performing step of performing communications by using the proper code; and
    a feedback step of newly selecting a proper code by using the correlation value of the plurality of codes included in the test data transmitted in the communications performing step if a pre-set time duration has lapsed or if a reception error of more than a pre-set reference occurs, and performing the communications performing step again,
    wherein the test data transmitted in the communications testing step and the communications performing step includes a plurality of codes each having a different frequency band.

2. The method of claim 1, wherein, in the proper selecting step, correlation values of each of the plurality of codes included in the test data transmitted in the communications testing step are calculated and a code having the smallest correlation value is selected as a proper code.

3. The method of claim 1, wherein, in the feedback step, correlation values of each of the plurality of codes included in the test data transmitted in the communications performing step are calculated and a code having the smallest correlation value is newly selected as a proper code, and the communications performing step is performed again.

4. The method of claim 1, wherein the test data transmitted in the communications testing step and the communications performing step is included in a header of transmission data transmitted or received in the communications testing step and communications performing step.

5. The method of claim 1, wherein, in the communications performing step, communications are performed by changing one or more of a time diversity (TD) degree and a frequency diversity (FD) degree or by changing a modulation degree.

6. An adaptive frequency selective baseband communications method using orthogonal codes, the method comprising:

a communications testing step of performing communications by using one of a plurality of codes each having a different frequency band;

a proper code selecting step of detecting a reception error and selecting a proper code by using the detected reception error;

a communications performing step of performing communications by using the proper code; and a feedback step of sequentially repeating the proper code selecting step and the communications performing step continuously while communications are being performed.

7. The method of claim 6, wherein, in the proper code selecting step, if the detected reception error is smaller than a pre-set reference value, a currently used code is selected as a proper code, whereas if the detected reception error is not smaller than the pre-set reference value, one of the plurality of remaining codes, excluding the currently used code, is selected as a proper code.

8. The method of claim 6, wherein, in the communications performing step, communications are performed by changing one or more of a time diversity (TD) degree and a frequency diversity (FD) degree or by changing a modulation degree.

* * * * *